(12) United States Patent
Dischinger et al.

(10) Patent No.: US 11,149,583 B2
(45) Date of Patent: Oct. 19, 2021

(54) GAS TURBINE ENGINE PARTICULATE INGESTION AND ACCUMULATION SENSOR SYSTEM AND METHOD

(71) Applicant: HONEYWELL INTERNATIONAL INC., Morris Plains, NJ (US)

(72) Inventors: Dave Dischinger, Tempe, AZ (US); Nick Nolcheff, Chandler, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/834,112

(22) Filed: Mar. 30, 2020

(65) Prior Publication Data

US 2020/0224550 A1 Jul. 16, 2020

Related U.S. Application Data

(63) Continuation-in-part of application No. 15/490,029, filed on Apr. 18, 2017, now abandoned.

(51) Int. Cl.
*F01D 21/00* (2006.01)
*F01D 17/02* (2006.01)
(Continued)

(52) U.S. Cl.
CPC ........... *F01D 21/003* (2013.01); *F01D 17/02* (2013.01); *F01D 21/10* (2013.01); *F02C 7/05* (2013.01);
(Continued)

(58) Field of Classification Search
CPC ........ F01D 17/02; F01D 21/003; F01D 21/10; F01D 25/02; F01D 21/14; F01D 17/24;
(Continued)

(56) References Cited

U.S. PATENT DOCUMENTS 4,888,948 A 12/1989 Fisher et al.
8,074,498 B2 12/2011 Agrawal et al.
(Continued)

FOREIGN PATENT DOCUMENTS

EP 2305958 A2 4/2011
EP 2538199 A2 12/2012
(Continued)

OTHER PUBLICATIONS

Howard, C; Hal Technology introduces real-time engine particulate ingestion rate sensor for health monitoring; Intelligent AEROSPACE Global Aerospace Technology Network; Fontana, CA; May 20, 2016.
(Continued)

*Primary Examiner* — Patrick Hamo
*Assistant Examiner* — Joseph S. Herrmann
(74) *Attorney, Agent, or Firm* — Lorenz & Kopf, LLP (57) ABSTRACT

A system and method for determining particulate accumulation in a gas turbine engine includes sensing the number, size, and type of particulate at a first position on the gas turbine engine and supplying first data representative thereof, where the first position located at a first side of a gas turbine engine component; sensing the number, size, and type of particulate at a second position on the gas turbine engine and supplying first data representative thereof, where the second position located at a second side of the gas turbine engine component and downstream of the first position; and processing the first data and the second data to determine the mass of the particulate accumulated on the gas turbine engine component.

11 Claims, 4 Drawing Sheets

(51) Int. Cl.
*F01D 21/10* (2006.01)
*F02C 7/05* (2006.01)
*G01M 15/14* (2006.01)

(52) U.S. Cl.
CPC .. *F05D 2220/323* (2013.01); *F05D 2260/607* (2013.01); *F05D 2260/80* (2013.01); *F05D 2270/11* (2013.01); *F05D 2270/80* (2013.01); *G01M 15/14* (2013.01)

(58) Field of Classification Search
CPC ...... F01D 17/105; F01D 17/162; F01D 17/16; F01D 25/10; F02C 7/05; F05D 2220/3217; F05D 2220/323; F05D 2220/36; F05D 2260/607; F05D 2260/80; F05D 2270/11; F05D 2260/83; F05D 2270/02; F05D 2270/30; F05D 2270/80; F05D 2270/803; F05D 2270/804; F05D 2270/805; G01M 15/14; G01M 15/102; B64D 15/20; G01N 15/02; G01N 15/06
See application file for complete search history.

(56) References Cited

U.S. PATENT DOCUMENTS

| | | | |
|---|---|---|---|
| 8,256,277 B2* | 9/2012 | Khibnik | F01D 21/10 73/112.01 |
| 8,459,103 B2* | 6/2013 | Khibnik | F01D 21/003 73/112.01 |
| 8,869,537 B2 | 10/2014 | Geis et al. | |
| 9,116,243 B1 | 8/2015 | Brown | |
| 9,222,873 B2* | 12/2015 | Baumgardner | G01S 7/4802 |
| 9,334,807 B2 | 5/2016 | deGaribody | |
| 9,714,967 B1* | 7/2017 | Weickert | G01N 15/0656 |
| 9,776,731 B1* | 10/2017 | Lieberman | B64D 45/00 |
| 9,983,189 B2* | 5/2018 | Perreault | G01N 33/2888 |
| 10,073,008 B2* | 9/2018 | Weickert | G01N 15/0656 |
| 2012/0324987 A1 | 12/2012 | Khibnik et al. | |
| 2014/0330459 A1 | 11/2014 | Baumgardner et al. | |
| 2016/0202168 A1 | 7/2016 | Knobloch et al. | |
| 2018/0298778 A1* | 10/2018 | Dischinger | F01D 17/02 |

FOREIGN PATENT DOCUMENTS

| | | |
|---|---|---|
| EP | 3301397 A1 | 4/2018 |
| EP | 3392467 A1 | 10/2018 |
| WO | 2016197259 A1 | 12/2016 |

OTHER PUBLICATIONS

Department of Defense; Real Time Gas Turbine Engine Particulate Ingestion Sensor for Particle Size and composition; SBIR STTR America's See Fund Powered by SBA; Apr. 22, 2016.
Ray, M. et al; Optical Detection of Airborne Ice Crystals and Liquid Water Droplets; 1st AIAA Atmospheric and Space Environments Conference; Jun. 22-25, 2009, San Antonio, Texas; AIAA 2009-3863.
"Particle Measurement Devices." Droplet Measurement Technologies, Inc., 2015 [retrieved on Oct. 28, 2019]. Retrieved from the Internet:<URL:www.dropletmeasurement.com/products/cloud-physics>.

* cited by examiner

GAS TURBINE ENGINE PARTICULATE INGESTION AND ACCUMULATION SENSOR SYSTEM AND METHOD

CROSS-REFERENCE TO RELATED APPLICATION

This application is a continuation-in-part (CIP) of U.S. patent application Ser. No. 15/490,029, filed Apr. 18, 2017.

TECHNICAL FIELD

The present invention generally relates to gas turbine engines, and more particularly relates to a system and method for sensing particulate ingestion and accumulation.

BACKGROUND

Aircraft turbine engines, such as a turbofan gas turbine engine, may be exposed to numerous and varied environmental conditions both on the ground and in flight. For example, the engine may be exposed to supercooled liquid droplets, ice crystals, sand, dust, or volcanic ash. Such exposure may result in accumulation of ice or other particulate at various locations on or within the engine. Not surprisingly, such accumulation can adversely affect engine performance and/or have various other deleterious effects on engine components.

Presently, most aircraft engines are not equipped with systems that can differentiate between different types of particulate, let alone the quantity and size of the particulate. Knowing the type, quantity, and size of the particulate at various locations within the engine could be useful in determining if, and how much, particulate is accumulating at various locations on or within the engine.

Hence, there is a need for a system and method for sensing particulate ingestion and accumulation at one or more locations within a gas turbine engine. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a gas turbine engine particulate ingestion detection system includes a first particulate sensor, a second particulate sensor, and a processor. The first particulate sensor is mounted at a first position on the gas turbine engine, where the first position is located at a first side of a gas turbine engine component. The first particulate sensor is configured to sense particulate at the first position and supply a first sensor signal representative thereof. The second particulate sensor is mounted at a second position on the gas turbine engine, where the second position is located at a second side of the gas turbine engine component and downstream of the first position. The second particulate sensor is configured to sense particulate at the second position and supply a second sensor signal representative thereof. The processor is coupled to receive the first sensor signal and the second sensor signal. The processor is configured, upon receipt of the first and second sensors signal, to: (i) determine the type, quantity, and size of the particulate at the first position, (ii) determine the type, quantity, and size of the particulate at the second position, and (iii) determine, based at least on the quantity and size of the particulate at the first and second positions, an amount of particulate accumulated on the gas turbine engine component.

In another embodiment, a method for determining particulate accumulation in a gas turbine engine includes sensing particulate at a first position on the gas turbine engine and supplying a first sensor signal representative thereof, where the first position is located at a first side of a gas turbine engine component, and sensing particulate at a second position on the gas turbine engine and supplying a second sensor signal representative thereof, where the second position is located at a second side of the gas turbine engine component and downstream of the first position. The first sensor signal is processed to determine the type, quantity, and size of the particulate at the first position, and the second sensor signal is processed to determine the type, quantity, and size of the particulate at the second position. Based at least on the quantity and size of the particulate at the first and the second positions, an amount of the particulate accumulated on the gas turbine engine component is determined.

In yet another embodiment, a gas turbine engine particulate ingestion detection system, wherein the particulate is one or both of super cooled liquid droplets and frozen ice particles, includes a first particulate sensor, a second particulate sensor, and a processor. The first particulate sensor is mounted at a first position on the gas turbine engine, where the first position located at a first side of a gas turbine engine component. The first particulate sensor is configured to sense particulate at the first position and supply a first sensor signal representative thereof. The second particulate sensor is mounted at a second position on the gas turbine engine, where the second position located at a second side of the gas turbine engine component and downstream of the first position. The second particulate sensor is configured to sense particulate at the second position and supply a second sensor signal representative thereof. The processor is coupled to receive the first sensor signal and the second sensor signal, and is configured, upon receipt of the first and second sensors signal, to: (i) determine the type, quantity, and size of the particulate at the first position, (ii) determine the type, quantity, and size of the particulate at the second position, (iii) determine, based at least on the quantity and size of the particulate at the first and second positions, an amount of ice accreted on the gas turbine engine component, (iv) compare the amount of ice accreted on the gas turbine engine component to a threshold value, and (v) generate a signal when the amount exceeds the threshold value.

In still another embodiment, a gas turbine engine particulate ingestion detection system includes a first particulate sensor, a second particulate sensor, and a processor. The first particulate sensor is mounted at a first position on the gas turbine engine, where the first position is located at a first side of a gas turbine engine component. The first particulate sensor is configured to sense the number, size, and type of particulate at the first position and supply first data representative thereof. The second particulate sensor is mounted at a second position on the gas turbine engine, where the second position is located at a second side of the gas turbine engine component and downstream of the first position. The second particulate sensor is configured to sense the number, size, and type of particulate at the second position and supply second data representative thereof. The processor is coupled to receive the first and second data from the first and second particulate sensors, respectively. The processor is configured, upon receipt of the first and second data, to determine, based at least on the number, size, and type of the particulate at the first and second positions, the mass of the particulate accumulated on the gas turbine engine component.

In yet still another embodiment, a method for determining particulate accumulation in a gas turbine engine includes sensing the number, size, and type of particulate at a first position on the gas turbine engine and supplying first data representative thereof, where the first position located at a first side of a gas turbine engine component; sensing the number, size, and type of particulate at a second position on the gas turbine engine and supplying first data representative thereof, where the second position located at a second side of the gas turbine engine component and downstream of the first position; and processing the first data and the second data to determine the mass of the particulate accumulated on the gas turbine engine component.

Furthermore, other desirable features and characteristics of the particulate ingestion and accumulation system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
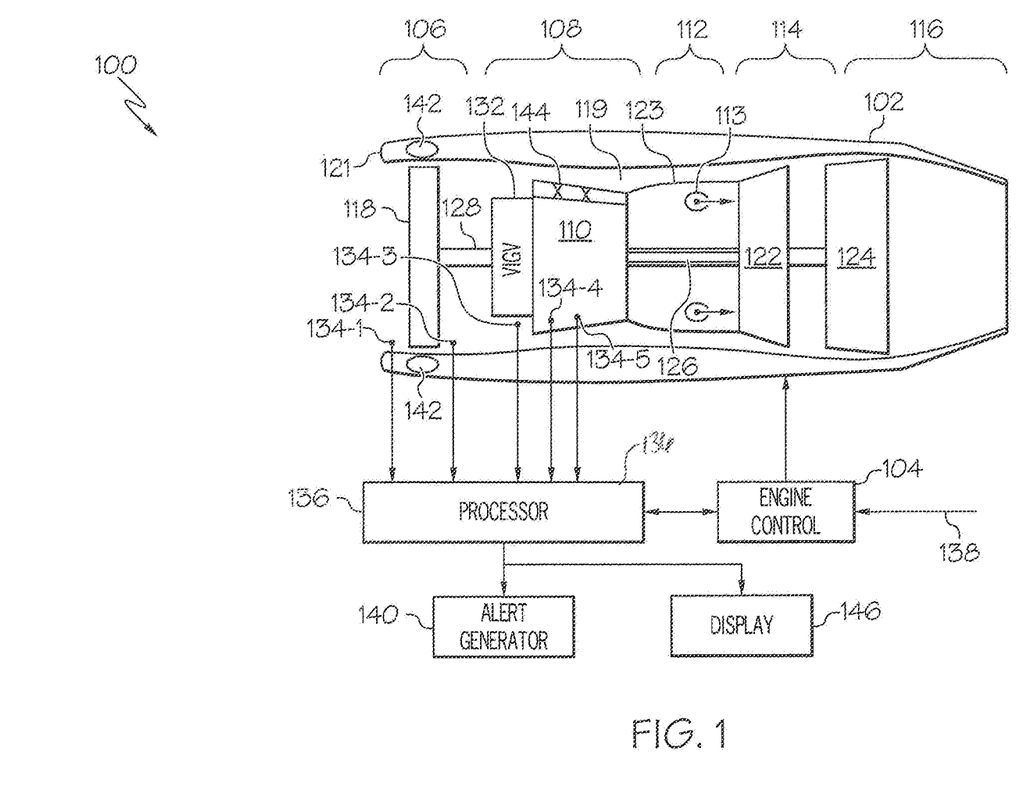
FIG. 1 depicts a simplified functional diagram of one embodiment of an engine control system for an aircraft.

Referring to FIG. 1, a simplified functional diagram of an exemplary engine system 100 for an aircraft is depicted and includes a turbofan gas turbine engine 102 and an engine control 104. In the depicted embodiment, the turbofan gas turbine engine 102 is implemented as multi-spool gas turbine engine and, as FIG. 1 further depicts, each includes an intake section 106, a compressor section 108, a combustion section 112, a propulsion turbine 114, and an exhaust section 116. The intake section 106 includes a fan 118, which draws air into the intake section 106. A fraction of the air exhausted from the fan 118 is directed through a bypass section 119 disposed between a fan case 121 and an engine cowl 123, and provides a forward thrust. The remaining fraction of air exhausted from the fan 118 is directed into the compressor section 108.

The compressor section 108, which may include one or more compressors, raises the pressure of the air directed into it from the fan 118, and directs the compressed air into the combustion section 112. In the depicted embodiment, only a single compressor 110 is shown, though it will be appreciated that one or more additional compressors could be used. In the combustion section 112, which includes a combustor assembly 113, the compressed air is mixed with fuel supplied from a non-illustrated fuel source. The fuel and air mixture is combusted, and the high energy combusted air mixture is then directed into the propulsion turbine 114.

The propulsion turbine 114 includes one or more turbines. In the depicted embodiment, the propulsion turbine 114 includes two turbines, a high pressure turbine 122, and a low pressure turbine 124. However, it will be appreciated that the propulsion turbine 114 could be implemented with more or less than this number of turbines. No matter the particular number, the combusted air mixture from the combustion section 112 expands through each turbine 122, 124, causing it to rotate. The combusted air mixture is then exhausted through the exhaust section 116 providing additional forward thrust.

As the turbines 122 and 124 rotate, each drives equipment in the engine 102 via concentrically disposed shafts or spools. Specifically, the high pressure turbine 122 drives the compressor 110, via a high pressure spool 126, at a rotational speed that is generally referred to as core engine speed (N2). The low pressure turbine 124 drives the fan 118, via a low pressure spool 128, at a rotational speed that is generally referred to as fan speed (N1). Though not included in the depicted embodiment, it will be appreciated that in some embodiments the engine 102 may include a reduction gearbox between the low pressure turbine 124 and the fan 118.

The engine control 104 is in operable communication with, and is configured to control the operation of the engine 102. In the depicted embodiment, the engine control 104 is configured, in response to a throttle setting 138, to control the flow of fuel to, and thus the power generated by, the engine 102. The engine control 104 is also configured to control the positions of one or more variable geometry devices, such as, for example, variable inlet guide vanes 132.

As FIG. 1 further depicts, the depicted engine system 100 also includes a plurality of particulate sensors 134 and a processor 136. The sensors 134 are each disposed at different positions on (or within) the gas turbine engine 102, and each sensor 134 is configured to sense particulate at its disposed position. In the depicted embodiment, the engine system 100 includes five particulate sensors disposed at five different locations. It will be appreciated that this is merely exemplary of one embodiment, and that the engine system 100 could be implemented with more or less than this number of particulate sensors 134. The particulate sensors 134 may also be implemented using any one of numerous types of particulate sensors now known or developed in the future. Some non-limiting examples of presently known particulate sensors include optical sensors, capacitive sensors, electrostatic sensors, lidar sensors, and backscatter sensors, just to name a few. It will additionally be appreciated that the type of particulate that each sensor 134 is configured to sense may vary. For example, the sensors 134 may each be configured to sense any one or more of water droplets (including supercooled water droplets), ice crystals, dust, and volcanic ash, just to name a few non-limiting examples of the types of particulate that may be sensed.

Regardless of the total number and specific type of sensors 134 that are used, the engine system 100 includes at least a first particulate sensor 134-1 and a second particulate sensor 134-2. The first particulate sensor 134-1 is mounted at a first position on the gas turbine engine 102, and the second particulate sensor 134-2 is mounted at a second position on the gas turbine engine 102. It is seen that the first position is located at a first side of a gas turbine engine component, and the second position is located at a second side of the gas turbine engine component and downstream of the first position. Thus, the first particulate sensor 134-1 senses particulate at the first position and supplies a first sensor signal representative thereof, and the second particulate sensor 134-2 senses particulate at the second position and supplies a second sensor signal representative thereof. Although the particular gas turbine engine component may vary, in the depicted embodiment it is the fan 118.

The processor 136 is coupled to receive the first sensor signal and the second sensor signal. The processor 136 is configured, upon receipt of the first and second sensor signals, to determine the type, quantity, and size of the particulate at the first and second positions. The processor 136 is additionally configured to determine, based at least on the quantity and size of the particulate at the first and second positions, the amount of particulate that has accumulated on the gas turbine engine component (e.g., the fan 118). It will be appreciated that the type of particulate accumulated on the gas turbine engine component may, at least in some embodiments, different from the type of particulate sensed at the first and second positions. Thus, for example, when the sensors 134 are configured to sense water droplets and/or ice crystals, the processor 136 may determine the amount of ice that has accreted on the gas turbine engine component. When the sensors 134 are configured to sense dust or volcanic ash, the processor 136 may determine the amount of dust or ash (which may be solidified into glass) that has accumulated on the gas turbine engine component.

In addition to determining the amount of the particulate that has accumulated on the gas turbine engine component, the processor is further configured to compare the amount of accumulated particulate to a threshold value. This threshold value may vary and may depend, for example, on the type of particulate being sensed, on the type of engine, and on the particular engine component. In any case, when the processor 136, based on this comparison, determines that the accumulated amount exceeds the threshold value, the processor 136 generates a signal. This signal may be used to generate an alert, to initiate a mitigation or corrective action, or both.

When the signal is used to generate an alert, then the system 100 additionally includes an alert generator 140. The alert generator 140 may be implemented as a visual alert, an aural alert, a haptic alert, or any one of numerous combination of these types of alerts. No matter how it is implemented, the alert generator 140 is coupled to receive the signal from the processor 136 and is configured, upon receipt of the signal, to generate an alert. The alert may communicate, for example, the type of particulate accumulated, which may in turn be used to determine a type of mitigation or corrective action to pursue.

When the signal is used to initiate a mitigation or corrective action, the signal may be supplied to one or more of the engine control 104, one or more anti-ice heaters 142, one or more controllable bypass channels (or valves) 144, and one or more display devices 146. The specific mitigation or corrective action, as may be appreciated, may be a function of the particular type of accumulated particulate, and preferably results in preventing or mitigating further particulate accumulation. As noted above, the engine control 104 is configured to, among other things, control at least the rotational speed of one or more of the gas turbine engine components. In some embodiments, the engine control 104 is further configured, upon receipt of the signal from the processor 136, to increase the rotational speed of one or more of the gas turbine components. This increase in speed will force a shed of the accumulated particulate and/or increase the temperature of the gas turbine engine component. In some embodiments, the engine control 104 may also be configured, upon receipt of the signal, to vary the positions of the one or more variable geometry devices (e.g., the variable inlet guide vanes 132). When the signal is supplied to the anti-ice heaters 142, the heaters 142, upon receipt of the signal, will generate heat.

The signal from the processor 136 may also be used to open one or more of the controllable bypass channels 144. The signal may be supplied directly to the controllable bypass channels 144 or to the engine control 104, which in turn opens the channels. Regardless, opening the bypass channels 144 will provide a flow path from the compressor 110 to the bypass section 119, which will exhaust particulate along the compressor outer diameter flow path out to the bypass section 119, thereby bypassing the combustor 113 and turbines 122, 124. When the signal is supplied to the one or more display devices 146, the display device 146 render, for example, a message to change the route or altitude of the vehicle (e.g., aircraft), to thereby exit the particulate source. It will be appreciated that the message may also, or instead, be supplied by the alert generator.

As was previously noted, the engine system 100 may include additional sensors. Indeed, in the depicted embodiment, the engine system 100 includes three additional particulate sensors 134 disposed at three different additional locations. More specifically, in addition to the first and second particulate sensors 134-1, 134-2, the depicted system 100 includes a third particulate sensor 134-3, a fourth particulate sensor 134-4, and a fifth particulate sensor 134-5.

The third particulate sensor 134-3 is mounted at a third position on the gas turbine engine 102, the fourth particulate sensor 134-4 is mounted at a fourth position on the gas turbine engine 102, and the fifth particulate sensor 134-5 is mounted at a fifth position on the gas turbine engine 102. Here, the third position is located at a first side of a second gas turbine engine component and downstream of the second position, and the fourth position is located at a second side of the second gas turbine engine component and downstream of the third position. In this embodiment, the second side of the second gas turbine engine component corresponds to the first side of a third gas turbine engine component, and the fifth position is located at the second side of the third gas turbine engine component and downstream of the fourth position. Although the second and third gas turbine engine components may vary, in the depicted embodiment each is a different stage (e.g., the first and second stages) of the compressor 110.

The third particulate sensor 134-3 senses particulate at the third position and supplies a third sensor signal representative thereof to the processor 136, the fourth particulate sensor 134-4 senses particulate at the fourth position and supplies a fourth sensor signal representative thereof to the processor 136, and the fifth particulate sensor senses particulate at the fifth position and supplies a fifth sensor signal representative thereof to the processor 136.

The processor 136, upon receipt of the additional sensor signals, determines the type, quantity, and size of particulate at the different positions. The processor 136 additionally determines, based at least on the quantity and size of particulate at each of the different positions, the amount of particulate accumulated on one or more additional gas turbine engine components (e.g., the first and second compressor stages).

Figure 2:
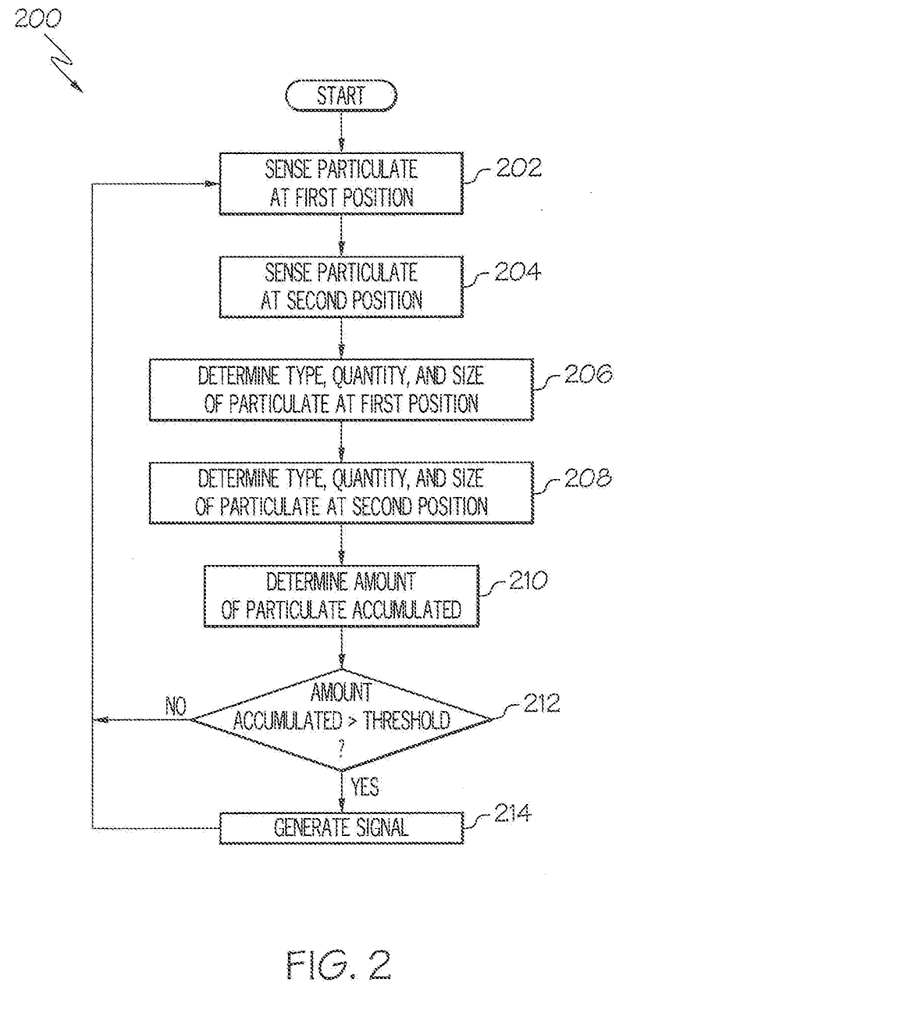
FIG. 2 depicts a process, in flowchart form, that may be implemented in the system depicted in FIG. 1.

One embodiment of a process for determining particulate accumulation in the gas turbine engine 102 that the system 100 implements is depicted, in flowchart form, in FIG. 2, and will now be described. Before proceeding, it is noted that the depicted process 200 is when the system 100 includes only two particulate sensors 134 (e.g., the first and second particulate sensors), but could readily be expanded for a system that includes three or more sensors 134.

The process begins by sensing particulate at a first position on the gas turbine engine and supplying a first sensor signal representative thereof (202), and sensing particulate at a second position on the gas turbine engine and supplying a second sensor signal representative thereof (204). As noted above, the first position is located at a first side of a gas turbine engine component, and the second position is located at a second side of the gas turbine engine component and downstream of the first position. The first sensor signal is processed to determine the type, quantity, and size of the particulate at the first position (206), and the second sensor signal is processed to determine type, quantity, and size of the particulate at the second position (208).

After the type, quantity, and size of the particulate at the first and second locations are determined, the amount of particulate accumulated on the gas turbine engine component is then determined (210). As previously noted, this determination is based at least on the quantity and size of particulate at the first and the second positions. The amount of particulate accumulated on the gas turbine engine component is then compared to a threshold value (212). If the amount exceeds the threshold value, then an alert is generated (214). If not, then the process 200 repeats. Though not depicted in FIG. 2, it will be appreciated that the process 200 may be further expanded to include, for example, communicating the type of particulate accumulated on the gas turbine engine component, and/or initiating one or more mitigation or corrective actions.

Figure 3:
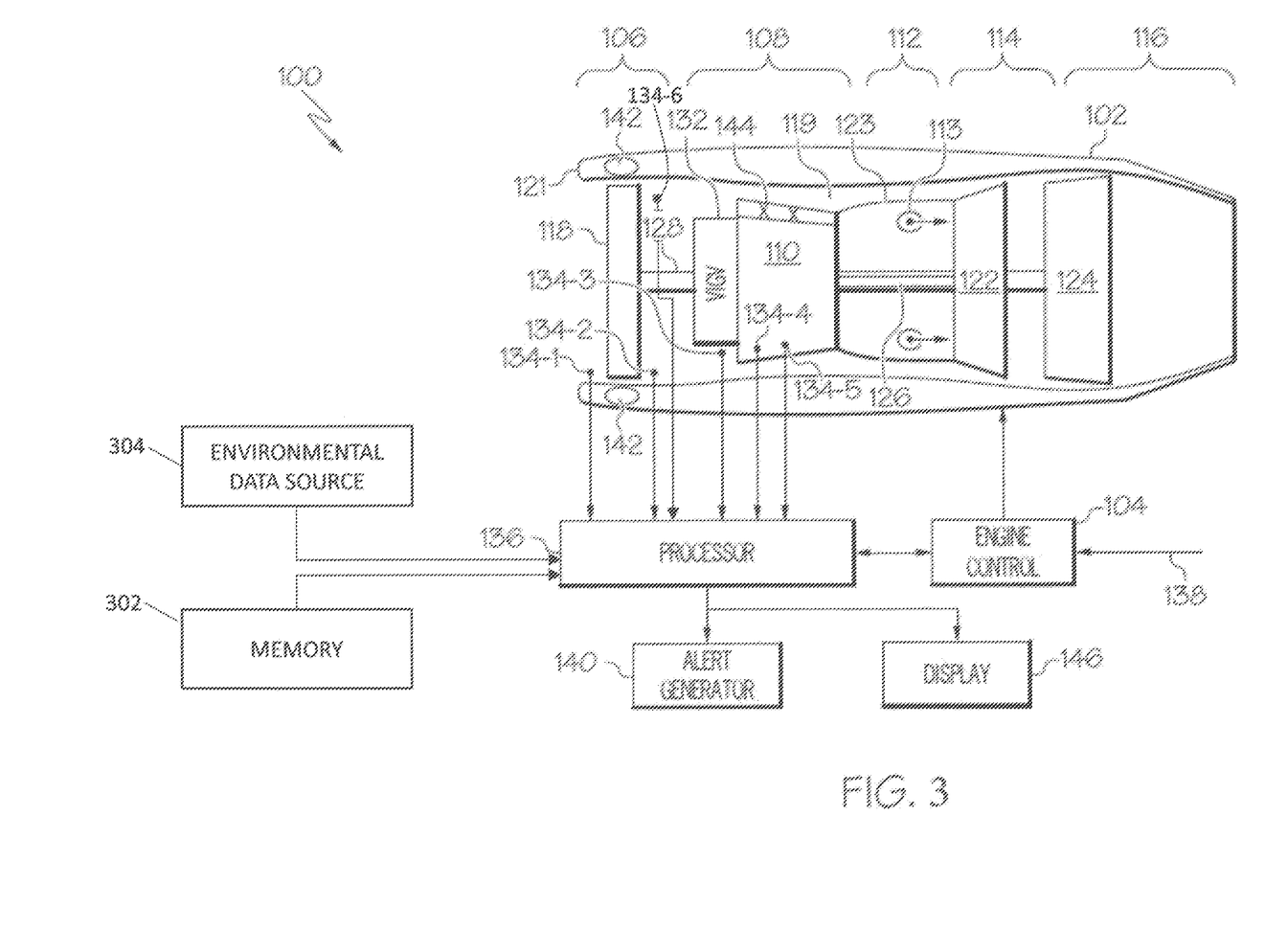
FIG. 3 depicts a simplified functional diagram of another embodiment of an engine control system for an aircraft.

In another embodiment, which is depicted in FIG. 3, each of the particulate sensors 134 is implemented using an optical particle detector, such as the one disclosed in U.S. Pat. No. 9,222,873 (the '873 patent), and assigned to Droplet Measurement Technologies, Inc., of Boulder, Colo. The particulate sensor 134 disclosed therein is an optoelectronic device that is configured to detect and identify the number, size, and type of particulate, including water droplets, ice crystals, dust particles, and volcanic ash particles. The particulate sensor 134 disclosed therein also supplies data representative of the number, size, and type of particulate being detected.

In the embodiment that includes the above-described particulate sensors 134, the engine system 100 also includes at least a first particulate sensor 134-1 and a second particulate sensor 134-2. The first particulate sensor 134-1 is mounted at a first position on the gas turbine engine 102, and the second particulate sensor 134-2 is mounted at a second position on the gas turbine engine 102. It is seen that the first position is located at a first side of a gas turbine engine component, and the second position is located at a second side of the gas turbine engine component and downstream of the first position. Thus, the first particulate sensor 134-1 senses the number, size, and type of particulate at the first position and supplies first data representative thereof, and the second particulate sensor 134-2 senses the number, size, and type of particulate at the second position and supplies second data representative thereof. Although the particular gas turbine engine component may vary, in the depicted embodiment it is the fan 118.

The processor 136 is coupled to receive the first data and the second data. The processor 136 is configured, upon receipt of the first and second data, to determine, based at least on the number, size, and type of the particulate at the first and second positions, the mass of the type of particulate that has accumulated on the gas turbine engine component (e.g., the fan 118). To do so, for example, the processor 136 may determine the mass of the sensed particulate that has passed by the first particulate sensor 134-1 during a predetermined sampling time period, and the mass of the sensed particulate that has passed by the second particulate sensor 134-2 during the same predetermined sampling time period. It will be appreciated that the predetermined sampling time period may be selected to meet desired functional and/or accuracy goals or requirements. For example, it may be as short as a few microseconds or as long as several minutes, just to provide a couple of examples.

Regardless of what the specific sampling time period is, it will be appreciated by subtracting the mass of the sensed particulate that has passed by the second particulate sensor 134-2 from the mass of the sensed particulate that has passed by the first particulate sensor 134-1, the mass of particulate that has accumulated on the gas turbine engine component during the predetermined sampling time period may be determined. The processor 136 may then determine the total mass of particulate accumulated on the gas turbine engine component, by integrating, over time, the mass of accumulated particulate determined during each predetermined sampling time period. It will be appreciated that the processor 136 may be configured to begin integrating upon system initialization or, in some embodiments, to not begin integrating until the first particulate sensor 134-1 senses particulate. The total mass of particulate accumulated on the gas turbine engine component may also be stored in a memory 302 that is in operable communication with, or resident on, the processor 136. The stored values may be used to accurately track the mass of particulate accumulated several operational cycles. The values may also be reset upon replacement and/or cleaning of the gas turbine engine component.

It will be appreciated that the processor 136 may determine the mass particulate that has passed by the first and second particulate sensors 134-1, 134-2 during the predetermined sampling time period by determining the volume of particulate that passed by the first and second particulate sensors 134-1, 134-2 during the predetermined sampling time period and multiplying each of the determined volumes by the density of the sensed particulate type. It will additionally be appreciated that the density of the particulate type may be stored, for example, in the memory 302. The densities may be stored, for example, in the form of a look-up table. It will be appreciated that the density of one or more of the particulate types may vary based on one or more of ambient temperature, ambient pressure, and aircraft altitude. Thus, as FIG. 3 further depicts, the processor 136 may also be in operable communication with a source of aircraft environmental data 304, which provides the processor 136 with data representative of one or more of these environmental parameters. It will be appreciated that the aircraft environmental data source 304 may be variously implemented. For example, it may comprise one or more individual sensors, data from the avionics system, or both.

To provide an example of the processing implemented in the processor 136, if the first data supplied from the first particulate sensor 134-1 indicates that 100 particles (number) of volcanic ash (type) that are each 1.0 mm$^3$ in size passed by the first position during the predetermined sampling time period, and the second data supplied from the second particulate sensor 134-2 indicates that 20 particles (number) of volcanic ash (type) that are each 1.0 mm$^3$ in size passed by the second position, the processor 136 will retrieve the density of volcanic ash from the memory 302. If the density of the volcanic ash, at the sensed temperature, pressure, and altitude, that is retrieved from the memory 302 is 0.0012 g/mm$^3$, the processor 136 will determine the mass of volcanic ash that passed by the first and second positions during the predetermined sampling time period to be 0.12 g (e.g., (100)(1.0 mm$^3$)(0.0012 g/mm$^3$)=0.12 g) and 0.024 g (e.g., (20)(1.0 mm$^3$)(0.0012 g/mm$^3$)=0.024 g), respectively. The processor 136 may then determine, by simple subtraction, that 0.096 g of volcanic ash has accumulated on the component between the first and second positions during the predetermined sampling time period.

As another example, if the first data supplied from the first particulate sensor 134-1 indicates that 100 particles (number) of ice (type) that are each 1.0 mm$^3$ in size passed by the first position during the predetermined sampling time period, and the second data supplied from the second particulate sensor 134-2 indicates that 20 particles (number) of ice (type) that are each 1.0 mm$^3$ in size passed by the second position, the processor 136 will retrieve the density of ice from the memory 302. If the density of the ice, at the sensed temperature, pressure, and altitude, that is retrieved from the memory 302 is 0.00092 g/mm$^3$, the processor 136 will determine the mass of ice that passed by the first and second positions during the predetermined sampling time period to be 0.092 g (e.g., (100)(1.0 mm$^3$)(0.00092 g/mm$^3$)= 0.092 g) and 0.018 g (e.g., (20)(1.0 mm$^3$)(0.00092 g/mm$^3$)= 0.018 g), respectively. The processor 136 may then determine, by simple subtraction, that 0.074 g of ice has accumulated on the component between the first and second positions during the predetermined sampling time period.

As yet another example, if the first data supplied from the first particulate sensor 134-1 indicates that 100 particles (number) of ice (type) that are each 1.0 mm$^3$ in size passed by the first position during the predetermined sampling time period, and the second data supplied from the second particulate sensor 134-2 indicates that 20 particles (number) of water droplets (type) that are each 1.0 mm$^3$ in size passed by the second position, the processor 136 will retrieve the density of ice and water from the memory 302. If the density of ice, at the sensed temperature, pressure, and altitude, that is retrieved from the memory 302 is 0.00092 g/mm$^3$, and the density of water, at the sensed temperature, pressure, and altitude, that is retrieved from the memory 302 is 0.001 g/mm$^3$, the processor 136 will determine the mass of ice that passed by the first position during the predetermined sampling time period to be 0.092 g (e.g., (100)(1.0 mm$^3$) (0.00092 g/mm$^3$)=0.092 g) and the mass of water that passed by the second position during the predetermined sampling period to be 0.020 g (e.g., (20)(1.0 mm$^3$)(0.001 g/mm$^3$)= 0.020 g), respectively. The processor 136 may then determine, by simple subtraction, that 0.072 g of water has accumulated on the component between the first and second positions during the predetermined sampling time period. In this case, the particulate accumulated on the component may be in the form of ice and/or liquid water depending on the specific thermodynamic conditions of the component at the time of accumulation.

As noted above, the particulate sensors 134 disclosed herein are configured to detect and identify the number, size, and type of multiple different particulate. Thus, as may be appreciated, the processor 136 may also be configured, in some embodiments, to simultaneously determine the mass of multiple types of particulate that have accumulated on the gas turbine engine component.

As may be appreciated, in some embodiments one or more of the particulate sensors 134 may not have a "sensor field of view" that encompasses the entire area at its location. This may be due, for example, to additional structure near the position. For example, the second particulate sensor 134-2 may not have a sensor field of view of the entire area at the second location (e.g., downstream of the fan 118). Thus, in such embodiments, the mass of particulate that has passed a location may be determined by dividing the sensed mass by the fraction of the location area that the particulate sensor 134 actually measures. For example, if the second particulate sensor 134-2 has a sensor field of view of a 180-degree arc aft of the fan 118, then the fraction of the location area is 0.5 (e.g., 360/180). The processor 136 would thus determine that the total mass that passed by the second location during the predetermined sampling period to be 2-times the mass determined from only the second data.

Related to the above, some embodiments may also be implemented with more than one particulate sensor 134 at one or more selected locations to assess the mass accumulation. For example, some embodiments may include two particulate sensors 134 (134-2 and 134-6 in FIG. 3) at the second location (e.g., downstream of the fan 118) that are disposed 180-degrees apart. In such embodiments, the processor 136 may determine the mass of particulate that passed each particulate sensor 134 at the same location and add the determined masses together to get the total mass at that location.

In addition to determining the mass of the particulate that has accumulated on the gas turbine engine component, the processor 136 is further configured to compare the mass of accumulated particulate to a threshold mass value. This threshold value may vary and may depend, for example, on the type of particulate being sensed, on the type of engine, and on the particular engine component. The threshold value for each type of particulate may be predetermined and stored in the memory 302 or it may be a user-supplied value that is input by a user. In any case, when the processor 136, based on this comparison, determines that the accumulated mass exceeds the threshold mass value, the processor 136 generates a signal. This signal may be used to generate an alert, to initiate a mitigation or corrective action, or both. For example, if the threshold mass value for volcanic ash is 100 grams, if the processor 136 determines that 80 grams of volcanic ash has accumulated, then the threshold has not been exceeded. Conversely, if the processor determines that 120 grams of volcanic ash has accumulated, then the threshold has been exceeded, and generates an alert signal.

When the signal is used to generate an alert, then the system 100 additionally includes the alert generator 140. The alert generator 140 may be implemented as a visual alert, an aural alert, a haptic alert, or any one of numerous combinations of these types of alerts. No matter how it is implemented, the alert generator 140 is coupled to receive the signal from the processor 136 and is configured, upon receipt of the signal, to generate an alert. The alert may communicate, for example, the type of particulate accumulated, which may in turn be used to determine a type of mitigation or corrective action to pursue.

When the signal is used to initiate a mitigation or corrective action, the signal may be supplied to one or more of the engine control 104, one or more anti-ice heaters 142, one or more controllable bypass channels (or valves) 144, and one or more display devices 146. The specific mitigation or corrective action, as may be appreciated, may be a function of the particular type of accumulated particulate, and preferably results in preventing or mitigating further particulate accumulation. As noted above, the engine control 104 is configured to, among other things, control at least the rotational speed of one or more of the gas turbine engine components. In some embodiments, the engine control 104 is further configured, upon receipt of the signal from the processor 136, to increase the rotational speed of one or more of the gas turbine components. This increase in speed will force a shed of the accumulated particulate and/or increase the temperature of the gas turbine engine component. In some embodiments, the engine control 104 may also be configured, upon receipt of the signal, to vary the positions of the one or more variable geometry devices (e.g., the variable inlet guide vanes 132). When the signal is supplied to the anti-ice heaters 142, the heaters 142, upon receipt of the signal, will generate heat.

The signal from the processor 136 may also be used to open one or more of the controllable bypass channels 144. The signal may be supplied directly to the controllable bypass channels 144 or to the engine control 104, which in turn opens the channels. Regardless, opening the bypass channels 144 will provide a flow path from the compressor 110 to the bypass section 119, which will exhaust particulate along the compressor outer diameter flow path out to the bypass section 119, thereby bypassing the combustor 113 and turbines 122, 124. When the signal is supplied to the one or more display devices 146, the display device 146 render, for example, a message to change the route or altitude of the vehicle (e.g., aircraft), to thereby exit the particulate source. It will be appreciated that the message may also, or instead, be supplied by the alert generator.

As was previously noted, the engine system 100 may include additional sensors. Indeed, in the depicted embodiment, the engine system 100 includes three additional particulate sensors 134 disposed at three different additional locations. More specifically, in addition to the first and second particulate sensors 134-1, 134-2, the depicted system 100 includes a third particulate sensor 134-3, a fourth particulate sensor 134-4, and a fifth particulate sensor 134-5.

The third particulate sensor 134-3 is mounted at a third position on the gas turbine engine 102, the fourth particulate sensor 134-4 is mounted at a fourth position on the gas turbine engine 102, and the fifth particulate sensor 134-5 is mounted at a fifth position on the gas turbine engine 102. Here, the third position is located at a first side of a second gas turbine engine component and downstream of the second position, and the fourth position is located at a second side of the second gas turbine engine component and downstream of the third position. In this embodiment, the second side of the second gas turbine engine component corresponds to the first side of a third gas turbine engine component, and the fifth position is located at the second side of the third gas turbine engine component and downstream of the fourth position. Although the second and third gas turbine engine components may vary, in the depicted embodiment each is a different stage (e.g., the first and second stages) of the compressor 110.

The third particulate sensor 134-3 senses particulate at the third position and supplies a third sensor signal representative thereof to the processor 136, the fourth particulate sensor 134-4 senses particulate at the fourth position and supplies a fourth sensor signal representative thereof to the processor 136, and the fifth particulate sensor senses particulate at the fifth position and supplies a fifth sensor signal representative thereof to the processor 136.

The processor 136, upon receipt of the additional sensor signals, determines the type, quantity, and size of particulate at the different positions. The processor 136 additionally determines, based at least on the quantity and size of particulate at each of the different positions, the amount of particulate accumulated on one or more additional gas turbine engine components (e.g., the first and second compressor stages).

Figure 4:
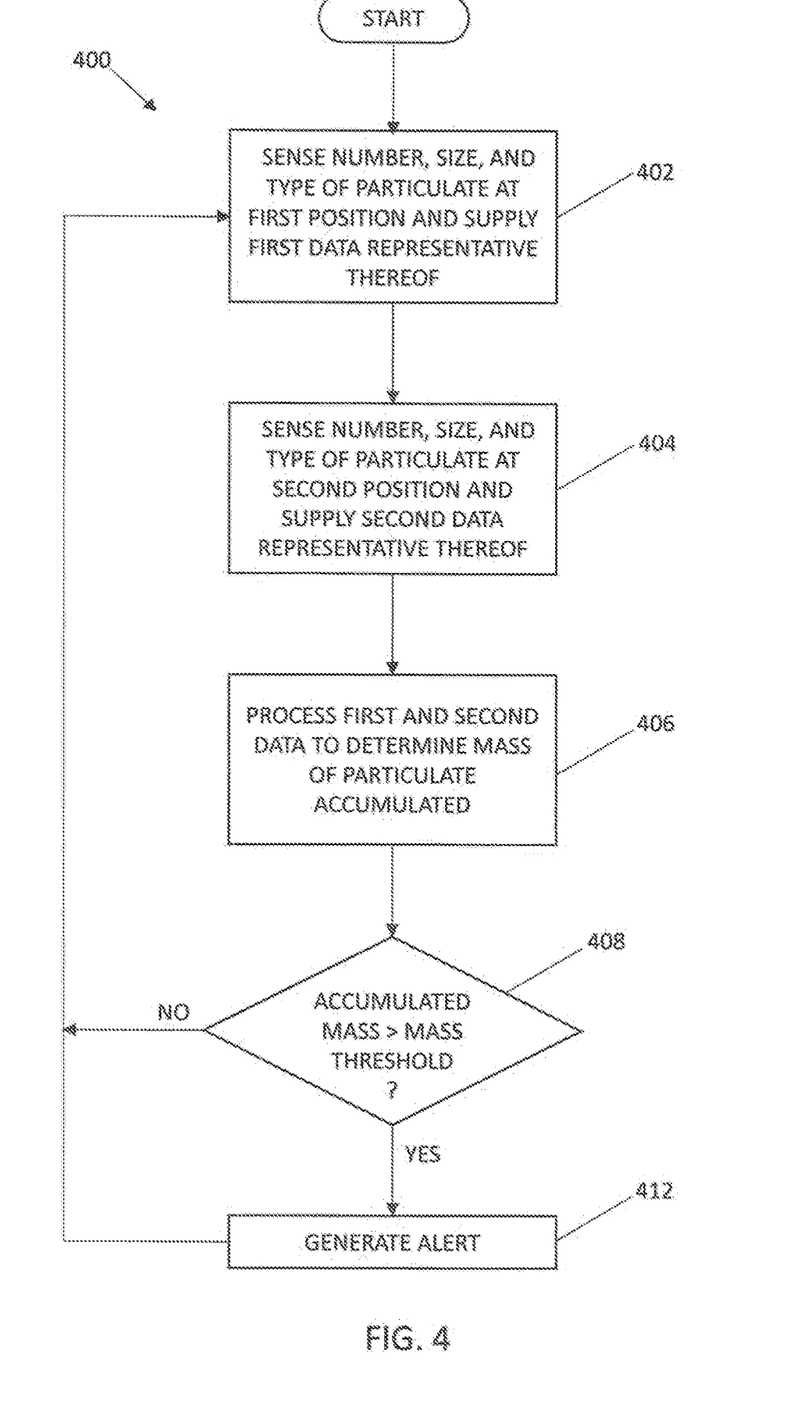
FIG. 4 depicts a process, in flowchart form, that may be implemented in the system depicted in FIG. 3.

Another embodiment of a process for determining particulate accumulation in the gas turbine engine 102 that the system 100 implements is depicted, in flowchart form, in FIG. 4, and will now be described. Before proceeding, it is noted that the depicted process 400 is when the system 100 includes only two particulate sensors 134 (e.g., the first and second particulate sensors), but could readily be expanded for a system that includes three or more sensors 134.

The process 400 begins by sensing the number, size, and type of particulate at a first position on the gas turbine engine and supplying first data representative thereof (402), and sensing the number, size, and type of particulate at a second position on the gas turbine engine and supplying second data representative thereof (404). As noted above, the first position is located at a first side of a gas turbine engine component, and the second position is located at a second side of the gas turbine engine component and downstream of the first position. The first data and the second data are processed to determine the mass of the particulate accumulated on the gas turbine engine component (406).

The mass of particulate accumulated on the gas turbine engine component is then compared to a threshold mass value (408). If the mass exceeds the threshold mass value, then an alert is generated (412). If not, then the process 400 repeats. Though not depicted in FIG. 4, it will be appreciated that the process 400 may be further expanded to include, for example, communicating the type of particulate accumulated on the gas turbine engine component, and/or initiating one or more mitigation or corrective actions.

The systems and methods described herein differentiate between different types, quantities, and sizes of particulate at various locations within a gas turbine engine, which allows determining if, and how much, particulate is accumulating at various locations on or within the engine.

In one embodiment, a gas turbine engine particulate ingestion detection system includes a first particulate sensor, a second particulate sensor, and a processor. The first particulate sensor is mounted at a first position on the gas turbine engine, where the first position is located at a first side of a gas turbine engine component. The first particulate sensor is configured to sense particulate at the first position and supply a first sensor signal representative thereof. The second particulate sensor is mounted at a second position on the gas turbine engine, where the second position is located at a second side of the gas turbine engine component and downstream of the first position. The second particulate sensor is configured to sense particulate at the second position and supply a second sensor signal representative thereof. The processor is coupled to receive the first sensor signal and the second sensor signal. The processor is configured, upon receipt of the first and second sensors signal, to: (i) determine the type, quantity, and size of the particulate at the first position, (ii) determine the type, quantity, and size of the particulate at the second position, and (iii) determine, based at least on the quantity and size of the particulate at the first and second positions, an amount of particulate accumulated on the gas turbine engine component.

These aspects and other embodiments may include one or more of the following features. The processor may be further configured to compare the amount of the particulate accumulated on the gas turbine engine component to a threshold value, and generate a signal when the amount exceeds the threshold value. The threshold value may depend on one or more of: the one or more types of particulate being sensed, the type of engine, and the particular engine component. An alert generator may be coupled to receive the signal from the processor and configured, upon receipt of the signal, to generate an alert. The alert may communicate the type of particulate accumulated on the gas turbine engine component. The signal may initiate one or more actions to prevent or mitigate further particulate accumulation. The one or more actions may include one or more of: increasing the rotational speed of one or more gas turbine engine components; varying positions of one or more variable geometry devices; energizing one or more heaters; opening one or more compressor bypass channels; and displaying one or more messages to exit a source of the particulate. The particulate may comprise one or more of water droplets, ice crystals, dust, and volcanic ash. The first and second sensors may each be selected from the group consisting of an optical sensor, a capacitive sensor, an electrostatic sensor, a lidar sensor, and a backscatter sensor. The system may further include a plurality of additional particulate sensors, where each additional particulate sensor is mounted at different positions on the gas turbine engine that are each different from the first and second positions, and each additional particulate sensor is configured to sense particulate at its position and supply an additional sensor signal representative thereof, and the processor may be further coupled to receive each of the additional sensor signals, and further configured, upon receipt of the additional sensors signal, to: determine type, quantity, and size of particulate at the different positions, and determine, based at least on the quantity and size of particulate at each of the different positions, an amount of the particulate accumulated on one or more additional gas turbine engine components. The first turbine engine component may be a fan, and the additional turbine engine components may include a first compressor stage and a second compressor stage.

In another embodiment, a method for determining particulate accumulation in a gas turbine engine includes sensing particulate at a first position on the gas turbine engine and supplying a first sensor signal representative thereof, where the first position is located at a first side of a gas turbine engine component, and sensing particulate at a second position on the gas turbine engine and supplying a second sensor signal representative thereof, where the second position is located at a second side of the gas turbine engine component and downstream of the first position. The first sensor signal is processed to determine the type, quantity, and size of the particulate at the first position, and the second sensor signal is processed to determine the type, quantity, and size of the particulate at the second position. Based at least on the quantity and size of the particulate at the first and the second positions, an amount of the particulate accumulated on the gas turbine engine component is determined.

These aspects and other embodiments may include one or more of the following features. Comparing the amount of the particulate accumulated on the gas turbine engine component to a threshold value, and generating an alert when the amount exceeds the threshold value. The threshold value may depend on one or more of: the one or more types of particulate being sensed, the type of engine, and the particular engine component. The alert may communicate the type of particulate accumulated on the gas turbine engine component. One or more actions to prevent or mitigate further particulate accumulation may be initiated. The one or more actions may include one or more of: increasing the rotational speed of one or more gas turbine engine components; varying positions of one or more variable geometry devices; energizing one or more heaters; opening one or more compressor bypass channels; and displaying one or more messages to exit a source of the particulate. The particulate may comprise one or more of water droplets, ice crystals, dust, and volcanic ash. Sensing particulate at a plurality of positions in the gas turbine engine that are each different from the first and second positions, and supplying a plurality of additional sensor signals. Processing each of the additional sensor signals to determine type, quantity, and size of particulate at the different positions, and determining, based at least on the quantity and size of particulate at each of the different positions, an amount of the particulate accumulated on one or more additional gas turbine engine components.

In yet another embodiment, a gas turbine engine particulate ingestion detection system, wherein the particulate is one or both of super cooled liquid droplets and frozen ice particles, includes a first particulate sensor, a second particulate sensor, and a processor. The first particulate sensor is mounted at a first position on the gas turbine engine, where the first position located at a first side of a gas turbine engine component. The first particulate sensor is configured to sense particulate at the first position and supply a first sensor signal representative thereof. The second particulate sensor is mounted at a second position on the gas turbine engine, where the second position located at a second side of the gas turbine engine component and downstream of the first position. The second particulate sensor is configured to sense particulate at the second position and supply a second sensor signal representative thereof. The processor is coupled to receive the first sensor signal and the second sensor signal, and is configured, upon receipt of the first and second sensors signal, to: (i) determine the type, quantity, and size of the particulate at the first position, (ii) determine the type, quantity, and size of the particulate at the second position, (iii) determine, based at least on the quantity and size of the particulate at the first and second positions, an amount of ice accreted on the gas turbine engine component, (iv) compare the amount of ice accreted on the gas turbine engine component to a threshold value, and (v) generate a signal when the amount exceeds the threshold value.

In still another embodiment, a gas turbine engine particulate ingestion detection system includes a first particulate sensor, a second particulate sensor, and a processor. The first particulate sensor is mounted at a first position on the gas turbine engine, where the first position is located at a first side of a gas turbine engine component. The first particulate sensor is configured to sense the number, size, and type of particulate at the first position and supply first data representative thereof. The second particulate sensor is mounted at a second position on the gas turbine engine, where the second position is located at a second side of the gas turbine engine component and downstream of the first position. The second particulate sensor is configured to sense the number, size, and type of particulate at the second position and supply second data representative thereof. The processor is coupled to receive the first and second data from the first and second particulate sensors, respectively. The processor is configured, upon receipt of the first and second data, to determine, based at least on the number, size, and type of the particulate at the first and second positions, the mass of the particulate accumulated on the gas turbine engine component.

These aspects and other embodiments may include one or more of the following features. The processor may be further configured to compare the mass of the particulate accumulated on the gas turbine engine component to a threshold mass value, and generate a signal when the mass exceeds the threshold mass value. The threshold mass value may depend on one or more of: the one or more types of particulate being sensed, the type of engine, and the particular engine component. An alert generator may be coupled to receive the signal from the processor and configured, upon receipt of the signal, to generate an alert. The alert may communicate the type of particulate accumulated on the gas turbine engine component. The signal may initiate one or more actions to prevent or mitigate further particulate accumulation. The one or more actions may include one or more of: increasing the rotational speed of one or more gas turbine engine components; varying positions of one or more variable geometry devices; energizing one or more heaters; opening one or more compressor bypass channels; and displaying one or more messages to exit a source of the particulate. The particulate may comprise one or more of water droplets, ice crystals, dust, and volcanic ash. The system may further include a plurality of additional particulate sensors, where each additional particulate sensor mounted at a corresponding position on the gas turbine engine that is different from the first and second positions. Each additional particulate sensor is configured to sense the number, size, and type of particulate at its corresponding position and supply additional data representative thereof. The processor is further coupled to receive the additional data from each of the additional sensor signals, and is further configured, upon receipt of the additional data determine, based at least on the number, size, and type of the particulate at the corresponding positions, a mass of the particulate accumulated on one or more additional gas turbine engine components. The first turbine engine component may be a fan, and the additional turbine engine components may include a first compressor stage and a second compressor stage.

In yet still another embodiment, a method for determining particulate accumulation in a gas turbine engine includes sensing the number, size, and type of particulate at a first position on the gas turbine engine and supplying first data representative thereof, where the first position located at a first side of a gas turbine engine component; sensing the number, size, and type of particulate at a second position on the gas turbine engine and supplying first data representative thereof, where the second position located at a second side of the gas turbine engine component and downstream of the first position; and processing the first data and the second data to determine the mass of the particulate accumulated on the gas turbine engine component.

These aspects and other embodiments may include one or more of the following features. Comparing the mass of the particulate accumulated on the gas turbine engine component to a threshold mass value, and generating an alert when the mass exceeds the threshold mass value. The threshold mass value may depend on one or more of: the one or more types of particulate being sensed, the type of engine, and the particular engine component. The alert may communicate the type of particulate accumulated on the gas turbine engine component. One or more actions to prevent or mitigate further particulate accumulation may be initiated. The one or more actions may include one or more of: increasing the rotational speed of one or more gas turbine engine components; varying positions of one or more variable geometry devices; energizing one or more heaters; opening one or more compressor bypass channels; and displaying one or more messages to exit a source of the particulate. The particulate may comprise one or more of water droplets, ice crystals, dust, and volcanic ash. Sensing the number, size, and type of particulate at a plurality of positions in the gas turbine engine that are each different from the first and second positions, and supplying a plurality of additional data representative thereof. Processing each of the additional data to determine the mass of the particulate accumulated on one or more additional gas turbine engine components.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine particulate ingestion detection system, comprising:
    a first particulate sensor mounted at a first position on the gas turbine engine, the first position located at a first side of a gas turbine engine component, the first particulate sensor configured to sense a number of, a size of, and a type of particulate at the first position and supply first data representative thereof;
    a second particulate sensor mounted at a second position on the gas turbine engine, the second position located at a second side of the gas turbine engine component and downstream of the first position, the second particulate sensor configured to sense a number of, a size of, and a type of the particulate at the second position and supply second data representative thereof; and
    a processor coupled to receive the first data and the second data from the first and second particulate sensors, respectively, the processor configured, to receive the first data and the second data, to determine, based at least on the number of, the size of, and the type of the particulate at the first and second positions, a mass of the particulate accumulated on the gas turbine engine component.

2. The system of claim 1, wherein the processor is further configured to:
    compare the mass of the particulate accumulated on the gas turbine engine component to a threshold mass value; and
    generate a signal when the mass of the particulate accumulated on the gas turbine engine component exceeds the threshold mass value.

3. The system of claim 2, wherein the threshold mass value depends on one or more of: the type of particulate being sensed, and the particular gas turbine engine component.

4. The system of claim 2, further comprising:
    an alert generator coupled to receive the signal from the processor and to generate an alert after receiving the signal.

5. The system of claim 4, wherein the alert communicates the type of particulate accumulated on the gas turbine engine component.

6. The system of claim 2, wherein the signal initiates one or more actions to mitigate further particulate accumulation on the gas turbine engine component.

7. The system of claim 6, wherein the one or more actions include one or more of:
- increasing the rotational speed of the gas turbine engine component;
- varying a position of one or more variable geometry devices in the gas turbine engine;
- energizing one or more heaters in the gas turbine engine;
- opening one or more compressor bypass channels in the gas turbine engine; and
- displaying one or more messages to exit a source of the particulate on a display for the gas turbine engine.

8. The system of claim 1, wherein the particulate comprises one or more of water droplets, ice crystals, dust, and volcanic ash.

9. The system of claim 1, further comprising:
- a third particulate sensor mounted at the second position on the gas turbine engine, the third particulate sensor configured to sense a number of, a size of, and a type of the particulate at the second position and supply third data representative thereof to the processor.

10. The system of claim 1, further comprising:
- a plurality of additional particulate sensors, each additional particulate sensor is mounted at a corresponding position on the gas turbine engine that is different from the first and second positions, each additional particulate sensor is configured to sense a number of, a size of, and a type of the particulate at its corresponding position and supply additional data representative thereof,
- wherein the processor is further coupled to receive the additional data from each of the additional sensor signals, and is further configured, upon receipt of the additional data to:
  - determine, based at least on the number of, the size of, and the type of the particulate at the corresponding positions, a mass of the particulate accumulated on an additional gas turbine engine component.

11. The system of claim 10, wherein:
the gas turbine engine component is a first turbine engine component;
the first turbine engine component is a fan; and
the additional turbine engine component includes a first compressor stage and a second compressor stage.

* * * * *